United States Patent [19]

Woo

[11] 4,271,288

[45] Jun. 2, 1981

[54] NOVEL POLYAMIC ACID POLYMERS AND POLYIMIDE DERIVATIVES THEREOF

[75] Inventor: Edmund P. Woo, Midland, Mich.

[73] Assignee: The Dow Chemical Company, Midland, Mich.

[21] Appl. No.: 113,892

[22] Filed: Jan. 21, 1980

Related U.S. Application Data

[63] Continuation-in-part of Ser. No. 53,670, Jul. 2, 1979, abandoned.

[51] Int. Cl.³ .................. C08G 73/10; C08G 73/14
[52] U.S. Cl. ................ 528/353; 260/346.74; 428/446; 428/458; 528/183; 528/188; 528/352
[58] Field of Search ............. 528/183, 188, 352, 353; 260/346.74

[56] References Cited

U.S. PATENT DOCUMENTS

| | | | |
|---|---|---|---|
| 2,121,183 | 6/1938 | Binapfl | 260/346.74 |
| 3,179,633 | 4/1965 | Endrey | 528/353 X |
| 3,179,634 | 4/1965 | Edwards | 528/353 X |
| 3,272,843 | 9/1966 | Spatz | 260/346.74 |
| 3,293,278 | 12/1966 | Zienty et al. | 260/346.74 X |
| 3,373,171 | 3/1968 | Lucas et al. | 260/346.74 |
| 3,536,666 | 10/1970 | Berg | 528/353 X |
| 3,585,123 | 6/1971 | Godar et al. | 260/346.74 X |
| 3,634,325 | 1/1972 | Di Leone et al. | 528/352 X |

*Primary Examiner*—Howard E. Schain
*Attorney, Agent, or Firm*—Douglas N. Deline

[57] ABSTRACT

Novel polymeric materials are formed from dianhydride compounds of the formula

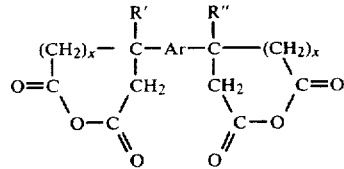

wherein Ar, R' and R" are named substituents, and both x's are either zeros or ones.

15 Claims, No Drawings

NOVEL POLYAMIC ACID POLYMERS AND POLYIMIDE DERIVATIVES THEREOF

CROSS-REFERENCE TO RELATED APPLICATION

This a continuation-in-part of my copending application Ser. No. 053,670 filed July 2, 1979, now abandoned.

BACKGROUND OF THE INVENTION

The invention relates to new chemical compounds and particularly to polymeric derivatives of dianhydride compounds, said dianhydrides characterized by having two 5- or 6-membered heterocyclic anhydride moieties bonded to the central arylene moiety by single carbon-to-carbon covalent bonds rather than by fusion to an aromatic or alicyclic ring.

DESCRIPTION OF THE PRIOR ART

The formation of polyamic acids, interchangeably known as polyamide acids, by the reaction of organic diamines and tetracarboxylic acid anhydrides is well-known. Compounds of this type have been disclosed in U.S. Pat. Nos. 3,179,614, 3,179,630 and 3,179,634, among others. Likewise, further curing of these polyamic acids to form polyimides having highly useful characteristics has been previously described, for example, U.S. Pat. Nos. 3,179,633 and 3,179,634.

Known polyimide compounds are generally high melting and sparingly soluble. These may be desirable qualities under some circumstances but are largely detrimental to handling and processing. Commercial polyimides made from pyromellitic dianhydride and aromatic diamines are illustrative of compounds possessing these disadvantageous qualities. It would be desirable to produce polyamide polymers not having the disadvantages of the prior art.

SUMMARY OF THE INVENTION

According to the instant invention there are provided polymeric derivatives of tetracarboxylic acid dianhydride compounds having lowered softening temperatures providing improved handling and processing qualities. The improved qualities result from the fact that the dianhydrides from which the compounds of this invention are derived contain single carbon to carbon covalent bonds between the arylene moiety and each anhydride functionality, thus providing greater flexibility to the resulting molecules.

DETAILED DESCRIPTION OF THE INVENTION

The invention comprises certain polyamic acid polymers having recurring structural units at least some of which comprise the formula

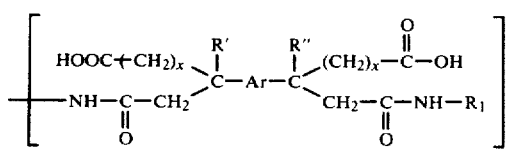

wherein Ar is a $C_{6-20}$ arylene radical selected from the group consisting of:

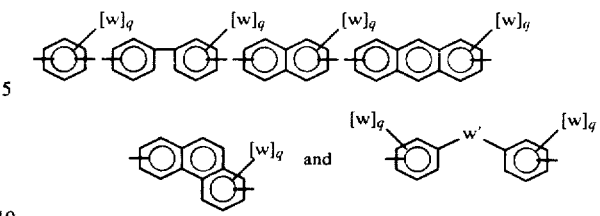

wherein w in each occurrence is halo, nitro, or a $C_{1-10}$ radical selected from alkyl, aryl, alkaryl, aralkyl, haloalkyl, haloaryl, aryloxy and alkoxy; q is an integer from zero to 4; and w' is oxygen, sulfur, alkylene, oxyalkylene, alkylenedioxy or polyoxyalkylene; R', R" individually are hydrogen or alkyl, aryl, aralkyl or alkaryl radicals containing up to 10 carbon atoms, both x's are either zeros or ones; and $R_1$ in each occurrence is a divalent organic radical remnant of a diamine having at least 2 carbon atoms. Also included are the polyimide polymers produced therefrom having recurring structural units, at least some of which comprise the formula

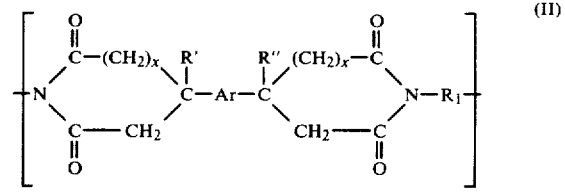

wherein Ar, R', R", x and $R_1$ are as previously defined. Also included are homopolymers of the above formulas I and II and continuous coherent articles such as films or compression molded articles produced from the polymers and homopolymers of this invention. Preferred are polymers as above-defined containing a characterizing amount of the recurring structural units I or II. Most preferred are homopolymers containing at least 5 recurring structural units I or II.

The compounds of this invention are formed by reacting specific hereinafter defined tetracarboxylic acid dianhydrides with organic diamine and substituted organic diamine compounds, or mixtures thereof. It should be understood that any of the processes for forming polyamic acid polymers and for converting these polymers into polyimides, either before or after molding them into useful articles, films, filaments, etc., may be used to produce the polymers and copolymers of this invention. Thus any of the processes disclosed in U.S. Pat. Nos. 3,179,614, 3,179,630, 3,179,631, 3,179,632, 3,179,634, and 3,264,250 may be employed. Also, the direct, solventless reaction process disclosed in U.S. Pat. No. 3,422,064 may be employed. The final polyimides may also be formed by proceeding through intermediates other than polyamic acids, e.g., polyamide esters, polyamide amides, polytetrazole acids, or polyimino lactones according to processes already known in the art.

A preferred method of reacting the tetracarboxylic acid dianhydride and diamine is to contact the two reactants in an inert solvent at a temperature and for a time sufficient to form the polyamic acid polymer. The polyamic acid may be recovered by solvent evaporation if desired. The resulting clear, tough polymer may be shaped and molded if desired or redissolved in an appropriately chosen solvent. Ultimately, curing at an elevated temperature produces a polyimide polymeric material with color, strength and other physical qualities similar to known polyimides.

Suitable solvents which may be used for this reaction include cresols, such as meta-cresol; and normally liquid solvents of the N,N-dialkylcarboxylamide class, such as N,N-dimethylformamide, N,N-dimethylacetamide, N,N-diethylformamide, N,N-diethylacetamide, N,N-dimethylmethoxy acetamide, N-methyl caprolactam, etc. Other solvents that may be used are: tetramethyl urea, pyridine, dimethyl sulfone, dimethyl sulfoxide, N-methyl-2-pyrrolidone, hexamethylphosphoramide, tetramethylene sulfone, formamide, N-methylformamide, and butyrol acetone. Preferred solvents are those of the N,N-dialkylcarboxylamide class. The solvents may be used alone, in combination, or in combination with inert diluents such as benzene, toluene, benzonitrile, dioxane, xylene, and cyclohexane.

The quantity of solvent used need be only sufficient to dissolve enough of one reactant, preferably the diamine, to initiate the reaction of the diamine and dianhydride. However, for operating convenience it is preferred to use a greater amount of solvent, up to 99.5 percent of the total mixture.

The polyamic acid-containing solution may be used as a liquid coating composition. Such compositions may be pigmented with, for example, titanium dioxide or other inert pigment materials in amounts from about 5 to about 200 percent by weight.

These coating compositions may be applied to a variety of substrates, for example, metals, e.g., copper, brass, aluminum, steel, etc., the metals in the form of sheets, fibers wires, screening, etc., glass in the form of sheets, fibers, foams, fabrics, etc.; polymeric materials, e.g., cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc.

It is also possible to form the polyamic acid composition into shaped articles as is already known in the art. The degree of polymerization of the polyamic acid is subject to deliberate control. The use of equal molar amounts of the reactants under the prescribed conditions provides polyamic acids of very high molecular weight. The use of either reactant in large excess limits the extent of polymerization. Besides using an excess of one reactant to limit the molecular weight of the polyamic acid, a chain terminating agent such as phthalic anhydride may be used to "cap" the ends of the polymer chain.

The polyamic acid polymer may be converted to the corresponding polyimide by heating above 50° C. Heating serves to convert pairs of amide and carboxylic acid groups to imide groups with a corresponding release of water. Heating may be conducted for a period of a few seconds to several hours.

Alternate methods of producing polyimides from polyamic acids may also be used, for example, reaction of the polyamic acid with a dehydrating agent as disclosed in U.S. Pat. Nos. 3,179,634 and 3,264,250. As already explained, any of the processes previously known in the art for forming the polyamic acid polymers and converting them into polyimides are suitable for producing the compounds of the instant invention.

The tetracarboxylic acid dianhydrides used in this invention are characterized by the following formula

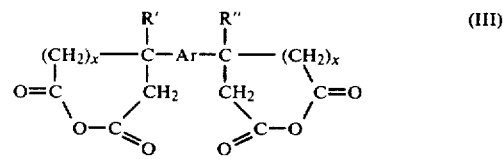

wherein Ar, R', R" and x are as previously defined.

Preferred tetracarboxylic acid dianhydride reactants are compounds of formula (III) wherein Ar is a phenylene radical. Most preferred tetracarboxylic acid dianhydride reactants are 1,4-bis(tetrahydrofuran-2,5-dion-3-yl)benzene, 1,3-bis(tetrahydrofuran-2,5-dion-3-yl)benzene, 1,4-bis(3-methyltetrahydrofuran-2,5-dion-3-yl)benzene, 1,4-bis(tetrahydropyran-2,6-dion-3-yl)benzene, 1,3-bis(tetrahydropyran-2,6-dion-3-yl)benzene and 1,4-bis(3-methyltetrahydropyran-2,6-dion-3-yl)benzene.

The tetracarboxylic acid dianhydrides of formula (III) suitable for use according to this invention and a method for producing them are more particularly described in my copending application Ser. No. 053,669 filed July 2, 1969. Accordingly, the compounds of formula (III) wherein both x's are zero are prepared by an initial Knovenagel dicarbonyl compound, either an aromatic dialdehyde or an aromatic diketone. The aromatic diketone may be symmetrical or unsymmetrical. Suitable alkyl cyanoacetate reactants are methyl cyanoacetate, ethyl cyanoacetate, propyl cyanoacetate, butyl cyanoacetate, pentyl cyanoacetate, hexyl cyanoacetate, heptyl cyanoacetate, oxyl cyanoacetate, nonyl cyanoacetate, and decyl cyanoacetate. A preferred alkyl cyanoacetate reactant is ethyl cyanoacetate.

Suitable aromatic dicarbonyl compounds are all compounds of the formula

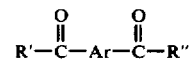

wherein R', R" and Ar are as previously defined.

Preferred aromatic dicarbonyl compounds are dialdehyde and diketone derivatives of benzene. Most preferred aromatic dicarbonyl compounds are terephthaldehyde, isophthaldehyde, and p-diacetylbenzene.

The condensation takes place as is known in an inert organic solvent in the presence of a basic catalyst, for example, ethylenediamine, pyridine, piperidine or a buffered catalyst system composed of an amine and the corresponding conjugate acid. Suitable solvents include anhydrous alcohols, e.g., methanol, ethanol, etc. The reaction proceeds smoothly at atmospheric pressure, however, reduced or elevated pressures may also be employed if desired. The condensation may be allowed to proceed at ambient temperature for a sufficient amount of time to produce a precipitate, illustratively about one hour or more. Reaction vessels of ordinary design and construction, e.g., glass flasks may conveniently be used. The product is recovered by filtration or decanting of liquid and may be recrystallized as for example from toluene, benzene or acetone.

The next step of the synthesis is to form the bis-dicyanoester. This may be done in two ways by reacting the bis(2-carbalkoxy-2-cyanoethenyl)arene produced in the initial Knovenagel condensation with an alkali metal cyanide followed by acidification. Alternatively one may contact HCN directly with the bis(2-carbalkoxy-2-cyanoethenyl)arene, as for example by contacting gaseous HCN with the dicyano compound in an inert liquid medium. Again ordinary reaction equipment and parameters may be employed, exercising caution of course when handling the dangerous cyanide reactants.

The bis[(alkoxycarbonyl)dicyanoalkyl]arene compounds are easily recovered as they precipitate from the acidic solution. They may be washed and purified, for example by recrystallization from alcoholic solvents.

Next the bis[(alkoxycarbonyl)dicyanoalkyl]arene compound is subjected to acid hydrolysis. It is not necessary that the bis-dicyano compound be first purified before being subjected to acid hydrolysis, although a recovery and purification step may be employed, if so desired. Preferably, excess concentrated hydrochloric or sulfuric acid is added to the same reaction vessel after the solvent from the above acidification step has been decanted, and the mixture is then refluxed. Because foaming is likely to occur, a defoaming agent should preferably be added to the mixture during the hydrolysis step. I have found a small amount of glacial acetic acid to act as an effective defoaming agent.

Refluxing is continued for several hours, up to ten hours or more. As the reaction progresses, the aromatic bis(dicarboxylic)acid forms and precipitates from solution. The precipitated products are easily recovered, for example, by chilling the solution and then filtering. The compounds may be washed with ice water to remove residual acid and dried under vacuum. Purification by recrystallization may conveniently be accomplished using water as a solvent.

The synthesis of aromatic dianhydrides of formula III wherein both x's are 0 is accomplished by conventional means, for instance by heating the aromatic bis(dicarboxylic acid) compounds of the previous step to at least about 200° C. under reduced pressure or by contacting them with acetic anhydride preferably at a temperature from about 50° C. to about 150° C., most preferably from about 130° C. to about 150° C. It is not usually requisite that the aromatic bis(dicarboxylic acid) compounds be first recrystallized before conversion to the dianhydrides, as the tetraacid compounds normally are produced in sufficiently pure form in the previous step.

The dianhydride products are separated and recovered by common techniques, for example, solvent evaporation when prepared by contacting with acetic anhydride. Purification if desired may be accomplished advantageously by recrystallization, as for example, from methyl ethyl ketone.

The compounds of formula (III) wherein both x's are 1 are prepared by an initial Knovenagel condensation of four equivalents of cyanoacetic acid with an aromatic dicarbnyl compound, either an aromatic dialdehyde or an aromatic diketone. The aromatic diketone may be symmetrical or unsymmetrical.

Suitable aromatic dicarbonyl compounds are those compounds previously mentioned. A preferred dicarbonyl compound is terephthaldehyde.

The reactants are combined in at least a 4:1 mole ratio of cyanoacetic acid and aromatic dicarbonyl compound. Preferably, a stoichiometric excess of cyanoacetic acid is present, e.g., the reactants are combined in a mole ratio greater than 4:1.

The condensation takes place in pyridine solvent, preferably in the presence of a catalyst, for example, piperidine. The condensation takes place at an elevated temperature. Preferable are temperatures from about 80° C. to 200° C., most preferably, from 100° C. to 150° C. The reaction proceeds smoothly at atmospheric pressure, however, reduced or elevated pressures may also be employed if desired. Reaction times of from several hours to 20 hours or more may be employed. Reaction vessels of ordinary design and construction, e.g., glass flasks may conveniently be used. The resulting product may be recovered by ordinary techniques, for example, by solvent evaporation under reduced pressure, and may be recrystallized if desired.

Next the tetracyano derivative is hydrolyzed to the tetraacid by refluxing in concentrated acid. It is not necessary that the tetra cyano compound be first purified before being subjected to acid hydrolysis, although a purification step, for example, recrystallization, may be employed if so desired. The acid employed may be concentrated sulfuric or concentrated hydrochloric acid. Because foaming is again likely to occur, a defoaming agent such as glacial acetic acid should preferably be employed.

The reaction conditions and recovery techniques employed are those described previously for the hydrolysis step in producing compounds of formula (III) wherein both x's are zero.

The tetraacid compound obtained may be recrystallized if desired, although the crude reaction product is generally obtained in sufficiently pure form for further use without a recrystallization step. A suitable solvent for use in recrystallization is a mixture of acetonitrile and dimethylsulfoxide.

The synthesis of aromatic dianhydrides of formula III wherein both x's are 1 is accomplished by the previously described process for producing, separating and purifying five-membered aromatic dianhydrides, e.g., heating to a temperature of at least about 200° C. under reduced pressure or contacting the tetraacid with acetic anhydride at elevated temperature and recovering the product.

The organic diamine and substituted diamine compounds for use in the instant invention are such as have been heretofore described as being suitable for use in the production of polyimide containing polymeric compositions. More particularly, the organic diamines suitable for use according to this invention include diamines of the formula

where Y is an inert substituent or hydrogen and $R_1$ is as previously defined a divalent organic radical containing at least 2 carbon atoms, and mixtures thereof. Suitable divalent organic radicals include those selected from the following groups: aromatic, aliphatic, cycloaliphatic, combination of aromatic and aliphatic, heterocyclic, and bridged organic radicals wherein the bridge is oxygen, nitrogen, sulfur, silicone or phosphorus and substituted groups thereof. There are no known diamines of formula IV that are unsuitable and it is believed that all such diamines may be used in the practice of this invention.

Examples of suitable diamines disclosed in the prior art include those of the above formula wherein $R_1$ is an arylene radical selected from the following:

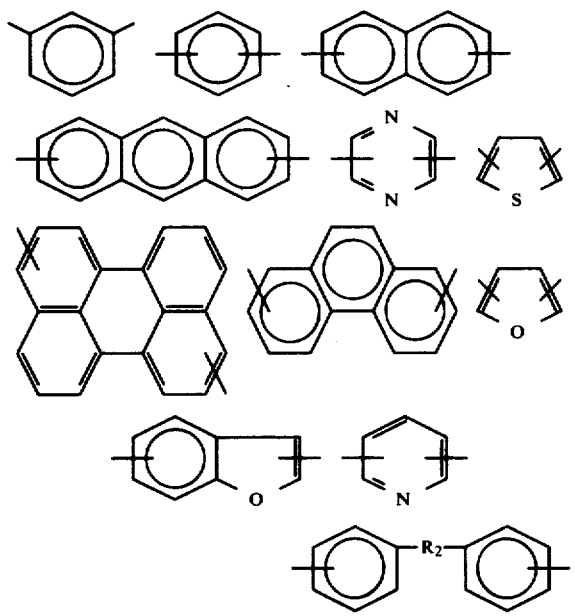

where $R_2$ is alkylene of 1–3 carbon atoms, oxygen, sulfur, or one of the following:

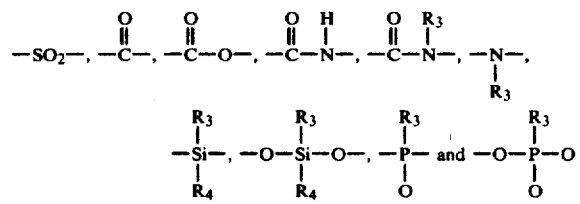

wherein $R_3$ and $R_4$ are alkyl or aryl, and substituted groups thereof.

Specific illustrative aromatic diamines of this group include those disclosed in U.S. Pat. No. 3,424,718, for example: meta-phenylene diamine, para-phenylene diamine, 2,2-bis(4-aminophenyl)propane, 4,4'-diaminodiphenyl methane, 4,4'-diaminodiphenyl sulfide, 4,4'-diaminodiphenyl sulfone, 3,3'-diaminodiphenyl sulfone, 4,4'-diaminodiphenyl ether, 2,6-diaminopyridine, bis(4-aminophenyl)diethyl silane, bis(4-aminophenyl)diphenyl silane, benzidine, 3,3'-dichlorobenzidine, 3,3'-dimethoxybenzidine, bis(4-aminophenyl)ethyl phosphine oxide, 4,4'-diaminobenzophenone, bis(4-aminophenyl)phenyl phosphine oxide, bis(4-aminophenyl)N-butylamine, bis(4-aminophenyl)N-methylamine, 1,5-diaminonaphthalene, 3,3'-dimethyl-4,4'-diaminobiphenyl, N-(3-aminophenyl)-4-aminobenzamide, 4-aminophenyl-3-aminobenzoate, p-bis(2-methyl-4-aminopentyl)benzene, bis(4-aminophenyl)-N-phenylamine, o-xylylene diamine, m-xylylene diamine, p-xylylene diamine, 2,4-bis($\beta$-amino-t-butyl)toluene, bis-(para-$\beta$-amino-t-butyl phenyl)ether, para-bis-($\beta$-methyl-delta-aminopentyl)benzene, 9,9-bis-(3-aminopropyl)-fluorene, para-bis-(1,1-dimethyl-5-aminopentyl)benzene

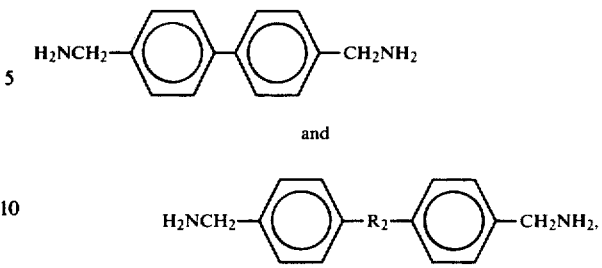

wherein $R_2$ is as hereinbefore defined, and mixtures thereof.

Suitable diamine reactants wherein $R_1$ is aliphatic or cycloaliphatic include those disclosed in U.S. Pat. No. 3,179,630, for example: 3-methylheptamethylene diamine, heptamethylene diamine, octamethylene diamine, nonamethylene diamine, decamethylene diamine, trimethylene diamine, tetramethylene diamine, hexamethylene diamine, 2,2-dimethylpropylene diamine, 1,1,3-trimethylpropylene diamine, 1,1,6,6-tetramethylhexamethylene diamine, 3,3-dimethylpentamethylene diamine, 3-methylhexamethylene diamine, 3-methoxyhexamethylene diamine, 3-methylheptamethylene diamine, 2,5-dimethylhexamethylene diamine, 2,2,5,5-tetramethylhexamethylene diamine, bis(3-aminopropyl)ether, 1,2-bis-(3-aminopropoxy)ethane, 1,2-bis-(3-aminopropoxy)propane, 4,4-dimethylheptamethylene diamine, 2,11-diamino-dodecane, 2,5-dimethylheptamethylene diamine, 5-methylnonamethylene diamine, 1,4-diamino cyclohexane, 1,12-diamino octadecane, 1,3-diamino adamantane, 3,3'-diamino-1,1'-diadamantane, 3,3'-diaminomethyl-1,1'-diadamantane, bis(para-amino-cyclohexyl)methane, 2,5-diamino-1,3,4-oxadiazole, $H_2N(CH_2)_3O(CH_2)_2O(CH_2)_3NH_2$, $H_2N(CH_2)_3S(CH_2)_3NH_2$, $H_2N(CH_2)_3N(CH_3)(CH_2)_3NH_2$, and mixtures thereof.

Also included are diamines of formula IV where $R_1$ is

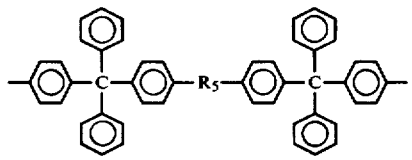

wherein $R_5$ is a linking radical of the group consisting of —O—, —S—, —CH$_2$— or —NH—. Such diamine compounds are known, their manufacture and use in the formation of polyimides having been described in U.S. Pat. No. 3,536,666 published Oct. 27, 1970.

Still further suitable diamines disclosed by the prior art are halogen-substituted aromatic or aliphatic diamines. For example, diamines of formula IV wherein $R_1$ is a halogenated radical. Examples of such diamines include halogenated phenylene diamines, halogenated diamino biphenyls, halogenated naphthalene diamines, and diamines of halogenated benzene nuclei linked through an intermediate oxygen, sulfur, alkylene, carbonyl or sulfonyl radical.

Illustrative of these diamines are tetrafluor-m-phenylene diamine, tetrafluoro-p-phenylene diamine, 3,3'-diamino-2,2',4,4',5,5',6,6'-octafluorobiphenyl, 4,4'-diamino-2.2',3,3',5,5',6,6'-octafluorobiphenyl, 4,4'-diaminodiphenyl ether, 4,4'-diamino-2,2',3,3',5,5',6,6'- octafluorodiphenyl ether, 4,4'-diamino-2,2',3,3',5,5',6,6'-octafluorodiphenyl methane, and 2,2-bis(4-aminophenyl)hexafluoropropane.

Further suitable diamines are the azodiamines, such as those disclosed in U.S. Pat. No. 3,455,879, for example, those wherein $R_1$ of the previously defined formula IV is selected from the group consisting of:

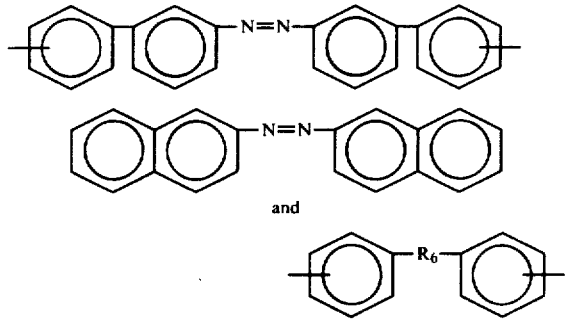

where $R_6$ is selected from the group —N—N—,

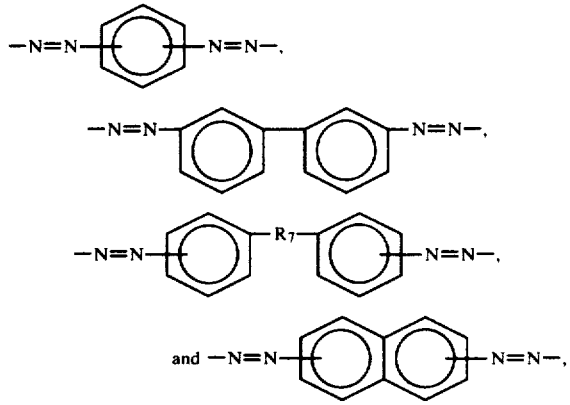

where $R_7$ is —N=N—, —O—, —S—,

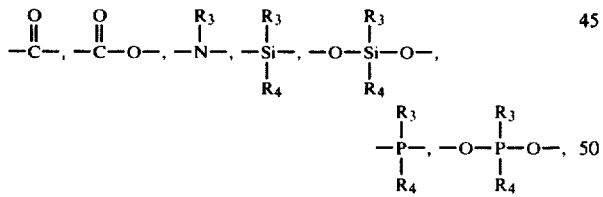

and an alkylene chain having 1 to 3 carbon atoms, and wherein $R_3$ and $R_4$ are alkyl or aryl. Typical azo-containing diamines that can be employed include 4,4'-diaminoazobenzene, 3,3'-diaminoazobenzene, 3,4'-diaminoazobenzene, 2,4'-diaminoazobenzene, p-bis(4-aminophenylazo)benzene, m-bis(4-aminophenylazo)benzene, p-bis(3-aminophenylazo)benzene, 4,4'-bis(p-aminophenylazo)azobenzene, 4,4'-bis(p-aminophenylazo)diphenyl, 4,4'-bis(p-aminophenylazo)diphenyl ether, and 4,4'-bis(p-aminophenylazo)diphenyl sulfone.

Other diamines known to the prior art are the amino aromatic hydrazides of the formula

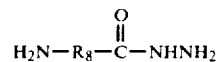

wherein $R_8$ is a carbocyclic aromatic or hetero aromatic cyclic radical. Examples of suitable amino aromatic hydrazides are those disclosed in U.S. Pat. No. 3,453,236 including: 2-aminobenzoyl hydrazide, 3-aminobenzoyl hydrazide, 4-aminobenzoyl hydrazide, 3-amino-4-methoxybenzoyl hydrazide, 3,5-dichloro-4-aminobenzoyl hydrazide, 1-amino-4-naphthoyl hydrazide, 1-amino-5-naphthoyl hydrazide, 1-amino-7-naphthoyl hydrazide, 1-amino-2,8-dichloro-7-naphthoyl hydrazide, 4-amino-4'-carboxyl-biphenyl hydrazide, 3,5-dimethoxy-4-amino-4'-carboxyl-biphenyl hydrazide, 4-amino-4'-carboxyl-diphenylether hydrazide, 4-amino-4'-carboxyl-diphenylsulfide hydrazide, 4-amino-4'-carboxyl-benzophenone hydrazide, 1-amino-7-carboxyl-anthracene hydrazide, 3-amino-6-carboxyl-quinoline hydrazide, 2-amino-6-carboxyl-quinoxaline hydrazide, 2-amino-7-carboxyl-acridine hydrazide, 2-amino-7-carboxyl-phenazine hydrazide, 2-amino-7-carboxyl-phenothiazine hydrazide, 2-carboxyl-5-amino-benzothiazole hydrazide, 2-carboxyl-6-amino-benzoxazole hydrazide, 2-carboxyl-6-amino-benzimidazole hydrazide, 2-carboxyl-6-amino-benzopyrrole hydrazide, 2-carboxyl-6-amino-benzothiophene hydrazide, 2-carboxyl-6-benzofuran hydrazide, 2-amino-7-carboxyl-carbazole hydrazide, and mixtures thereof.

Additional suitable diamine reactants include dibasic acid dihydrazides of the formula

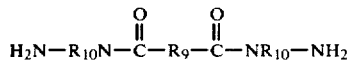

wherein $R_9$ is a carbon to carbon covalent bond or an aliphatic, aromatic, alicyclic, or heterocyclic radical and each $R_{10}$ is hydrogen, or an aliphatic, aromatic or alicyclic radical, disclosed in U.S. Pat. No. 3,360,502.

Furthermore, suitable diamine reactants include polysilicone diamines disclosed in U.S. Pat. No. 3,338,859. Included are such polysilicone diamines wherein $R_1$ of formula IV is of the formula:

wherein $R_{11}$ is a monovalent radical selected from the group consisting of hydrocarbon radicals, halogenohydrocarbon radicals, and non-halogenohydrolyzable radicals, each $R_{12}$ is a divalent organic radical and n has an average value from 3 to 100.

Specific examples of suitable silicone diamines useful in this invention include:

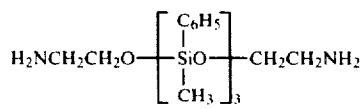

H2NCH2CH2O[(CH2)3SiO]3CH2CH2NH2
H2NCH2CH2CH2O[(C6H5)2SiO]4CH2CH2CH2NH2
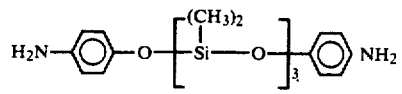
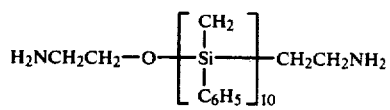
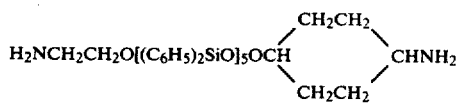
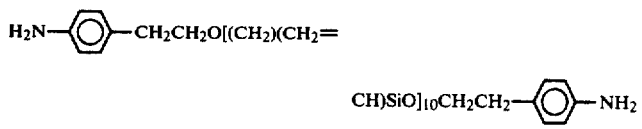
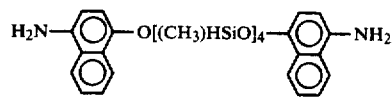
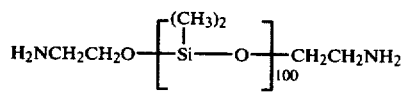
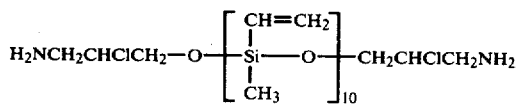
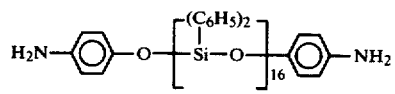
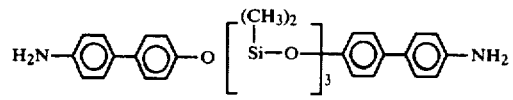
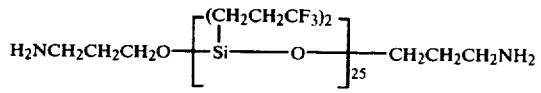
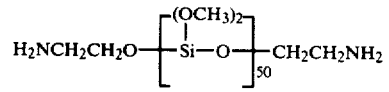
H2NCH2CH2OCH2CH2O[(CH3)2SiO]30CH2CH2OCH2CH2NH2 and
mixtures thereof.
Other suitable diamine reactants include diaminocyclic sulfones having the following formula:

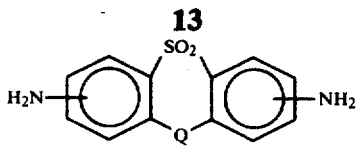

wherein Q is a member selected from the class consisting of —CH$_2$—, —C(CH$_3$)$_2$—, —C(C$_6$H$_5$)$_2$—, —O—, —S—, —SO$_2$—, —Si(CH$_3$)$_2$—, and a carbon to carbon covalent bond between the two benzenoid groups. Such diamines are disclosed in U.S. Pat. No. 3,539,537.

Substituted amines such as triorganosilyl amine compounds of the formula:

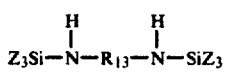

wherein Z is a monovalent hydrocarbon radical and R$_{13}$ is a divalent aromatic radical of at least 6 carbon atoms disclosed in U.S. Pat. No. 3,303,157 may also suitably be used in this invention.

It may be easily seen that a large number of diamine reactants are suitable for use in the practice of this invention. Also suitable are mixtures of such diamine compounds. The preferred diamines for use according to this invention are 4,4'-oxydianiline, 1,3- and 1,4-phenylene-diamine, 2,4- and 2,6-toluene-diamine, 4,4'-methylene dianiline, hexamethylene diamine, and mixtures thereof. Combinations of the previously described diamines with other reactant compounds may also be used.

In particular such a combination is useful when cross-linking is desired.

One method for accomplishing cross-linking in the polymer is to utilize a hydroxy-substituted diamine compound of the formula

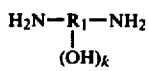

or a mixture of said hydroxy-substituted diamine with any other number of diamines wherein R$_1$ is a radical selected from the group consisting of

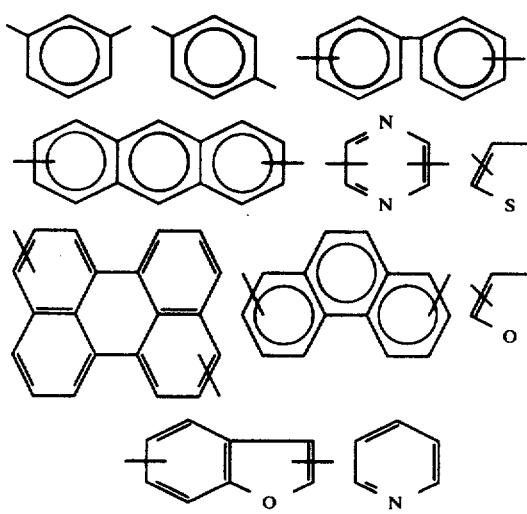

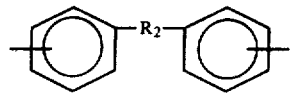

wherein R$_2$ is as previously defined. The number of hydroxy moieties occurring in a diamine molecule, determined by the integer value of k, along with the amount of hydroxy-substituted diamine employed are chosen to provide for sufficient cross-linking in the finished polymer, preferably at least one —OH group present in the formed polyimide for each 30 recurring structural units therein.

Suitable hydroxy-substituted diamines for use in this manner include: 1,3-diamino-2-hydroxypropane, 1,3-diamino-5-hydroxybenzene, 1,3-diamino-4-hydroxybenzene, 3,3'-dihydroxybenzidine, 4,8-diamino-1-naphthol, 4,8-diamino-2-naphthol, 1,6-diamino-3-hydroxyhexane, 1,3-diamino-5-hydroxycyclohexane, 1,4-diamino-2(2-hydroxyethyl)hexane.

The formation of cross-linkages in the polyamic acid and polyimide polymers containing recurring units of formulas I or II wherein R$_1$ is a remnant of a hydroxy-substituted diamine immediately hereinbefore described is accomplished by reacting the polyamic acid or polyimide polymers with one or more materials selected from the class that includes diisocyanates, diisothiocyanates, dicarboxylic acids, dicarboxylic acid diesters, dicarboxylic acid diacid chlorides, dicarboxylic acid anhydrides, tricarboxylic acid monoanhydrides, tetracarboxylic acid dianhydrides, bis(chlorocarbonates), ortho formate esters, titanium esters, tetraalkyl o-silicates, diepoxides, triepoxides, and dialdehydes.

More specific teaching of the method by which this cross-linking reaction occurs is contained in U.S. Pat. No. 3,437,636 which teaching is incorporated herein by reference.

Several other methods for producing cross-linked polyimides are known in the art. One alternate method requires initial production of a polyamic acid copolymer or its polyimide derivative containing recurring structural units of the formula:

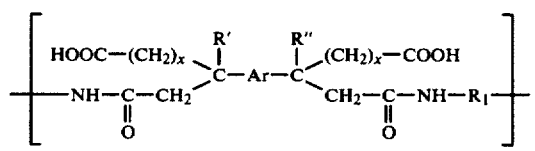

and at least an amount sufficient to form cross-linkages of the monomer

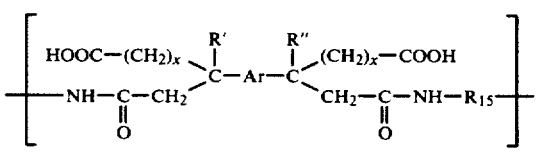

where Ar, R', R'', x and R$_1$ are as hereinbefore defined and R$_{15}$ is selected from the group consisting of —B—NH(CH$_2$)$_p$—A—(CH$_2$)$_p$—NH—B— and

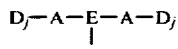

wherein A is arylene; B is selected from a group consisting of alkylene having 2 through 4 carbons and phenylene; D is alkylene of 1 through 4 carbons; E is

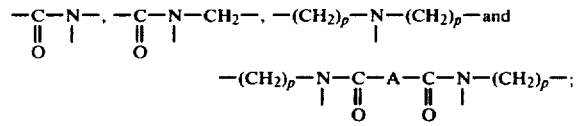

and j and p are independently either zero or one.

The cross-linked polymers are obtained by reacting the copolymer or its polyimide derivative with a polyfunctional carboxylic acid cross-linking agent or derivative thereof. Suitable cross-linking agents are those capable of reacting with two, three or four, —NH— groups of the cross-linkable $R_{15}$ radical and thus forming carbonyl-containing bridges between polymers.

Representative useful cross-linking agents include the following acids as well as their derived lower alkyl and phenyl esters, acid chlorides, anhydrides, and derivatives of mixed functionality: succinic acid; adipic acid; sebacic acid; isophthalic acid; terephthalic acid; trimellitic acid; bibenzoic acid; bis(4-carboxyphenyl)ether; bis(4-carboxyphenyl) sulfide thiophene-2,5-dicarboxylic acid; pyridine-2,4-dicarboxylic acid; and benzene-1,3,5-tricarboxylic acid.

In addition to the foregoing, the following tetra acids and their derivatives as indicated above can be used: pyromellitic acid; 2,3,6,7-naphthalene tetracarboxylic acid; 3,3',4,4'-diphenyl tetracarboxylic acid; 1,2,5,6-naphthalene tetracarboxylic acid; 2,2',3,3'-diphenyl tetracarboxylic acid; 2,2-bis(3,4-dicarboxyphenyl) propane; bis(3,4-dicarboxyphenyl) sulfone; 3,4,9,10-perylene tetracarboxylic dianhydride; bis(3,4-dicarboxyphenyl) ether; ethylene tetracarboxylic acid; naphthalene-1,2,4,5-tetracarboxylic acid; naphthalene-1,4,5,8-tetracarboxylic acid; decahydronaphthalene-1,4,5,8-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl) propane; 1,1-bis(2,3-dicarboxyphenyl) ethane; 1,1-bis(3,4-dicarboxyphenyl) ethane; bis(2,3-dicarboxyphenyl) methane; bis(3,4-dicarboxyphenyl) methane; bis(2,3-dicarboxyphenyl) sulfone; benzene-1,2,3,4-tetracarboxylic acid; 1,2,3,4-butane tetracarboxylic acid; thiophene-2,3,4,5-tetracarboxylic acid; 3,4,3',4'-benzophenone tetracarboxylic acid; 1,1,2,2-ethane tetracarboxylic acid; 2,3,3',4'-benzophenone tetracarboxylic acid; bis(3,4-dicarboxyphenyl) sulfide; cyclohexane-1,2,4,5-tetracarboxylic acid; dimethylcyclobutane-1,2,3,4-tetracarboxylic acid; tricyclo[4,2,2,0$^{2,5}$]-dec-7-ene-3,4,9,10-tetracarboxylic acid; etc., and mixtures thereof.

The cross-linking reaction is conducted by suitably reacting the materials as, for example, intimately mixing them together with or without solvent for a suitable amount of time to effect cross-linking of the polymers. The amount of cross-linking agent employed may range from as low as a few mole percent and up to 100 mole percent, based upon the amount of available secondary amino groups in $R_{15}$.

Disclosure of this process of cross-linking is contained in U.S. Pat. No. 3,492,270 for which disclosure it is herein incorporated by reference.

An additional means of providing cross-linking functionality is to heat at a temperature above 100° C. the polyamic acid polymers of this invention in the presence of a free-radical producing catalyst. In the resulting product, cross-linking bridges of a direct carbon to carbon bond are formed between two of the benzylic —CH— groups contained in adjacent polymer chains resulting in cross-linked polyimide polymers. It is also possible to form cross-linking bonds by heating the performed polyimide polymer with the free-radical producing catalyst. Suitable free-radical producing catalysts are organic peroxides having the general formula F—OO—F' wherein R is a hydrocarbon or oxyhydrocarbon group and F' is hydrogen, a hydrocarbon or an oxyhydrocarbon group.

Specific examples of the above organic peroxides include, where F and F' are alkyl: dimethyl peroxide, diethyl peroxide, and di-t-butyl peroxide; where F and F' are aralkyl: dicumyl peroxide; where F and F' are acyl: diacetyl peroxide, dipropionyl peroxide, dibutyryl peroxide, bis(heptafluorobutyryl)peroxide, dioctanoyl peroxide, dilauroyl peroxide, dibenzoyl peroxide, methoxy-, methyl-, t-butyl-, chloro-, bromo-, and cyano-substituted benzoyl peroxides, bis(p-chlorobenzyl)-peroxide, diisopropyl peroxydicarbonate, bis(2,4-dichlorobenzoyl)peroxide, anisoyl peroxide; where F is alkyl, alkaryl or cycloalkyl and F' is hydrogen: t-butyl hydroperoxide, n-octyl hydroperoxide, cumene hydroperoxide, diisopropyl benzene hydroperoxide, tetraallyl hydroperoxide, p-methane hydroperoxide, pinane hydroperoxide, and 2,5-dimethyl hexane-2,5-dihydroperoxide; where F is acyl and F' is alkyl, cycloalkyl, aryl, hydrogen: t-butyl-peracetate, t-butyl-perbenzoate, di-t-butyl-diperphthalate, and t-butyl-peroxyisobutyrate, peracetic acid, cyclohexanone peroxide, heptyl hydroperoxide, and methyl ethyl ketone peroxide; or mixtures thereof.

In particular, organic peroxides wherein F and F' in the above formula are alkyl radicals having 1 to 8 carbon atoms, aralkyl radicals having up to 10 carbon atoms and aryl radicals having from 7 to 13 carbon atoms are preferred.

It is also possible in the practice of this invention to produce foamed polyimide polymers. According to one such process a cross-linked polyimide foam is produced by employing an azo-type free-radical catalyst. Such catalysts evolve nitrogen during the cross-linking operation that will foam the polymer. Such azo-containing catalysts include: 2,2'-azobis(2-methylpropionitrile), 1,1'-azobis(1-cyanocyclohexane), 2,2'-azobis(2-methylpropionamide), dimethyl 2,2'-azobis(2-methylpropionate), or mixtures thereof.

Formation of cross-linked polyimide polymers according to this process of cross-linking is known having been previously described in U.S. Pat. No. 3,423,365.

An alternate method of producing a foamed polyimide is disclosed in U.S. Pat. No. 3,310,506 whereby the polyamic acid polymer is converted to a polyimide by heating a solution containing the polyamic acid at a temperature above 50° C. after having introduced bubbles into the solution by either a known blowing agent or by beating or agitating the solution. The reaction parameters and preferred operating conditions for this process are described in U.S. Pat. No. 3,310,506.

Another operable method of producing a foamed polyimide product is to react one of the hereinbefore described diamine compounds and the dianhydride compound of formula (III) in an inert solvent adding either a lower fatty acid anhydride or an aromatic monobasic anhydride, then adding an acid such as formic, oxalic, trichloroacetic, malonic, citric or alpha-hydroxy-butyric acids and agitating the solution until gelatin occurs. The product having bubbles dispersed throughout is then shaped if desired and heated to form the polyimide. A more detailed description of the process may be found in U.S. Pat. No. 3,249,561.

It should be understood that although the reactants used in this invention are the diamine compounds described previously and a dianhydride of formula III, these materials need not be used initially. Instead, precursors of these reactants may be used. For example, instead of using the dianhydride as such, a tetracarboxylic acid precursor to the dianhydride of formula III the formation of which is described in my copending application filed concurrently herewith may be used.

An illustrative example is in the production of foamed polyimide compositions in an aqueous system. Accordingly, one mole of the tetracarboxylic acid precursor corresponding to the dianhydride of formula (III) is combined in an aqueous solution with about two moles of a tertiary amine. The reaction product is then reacted further with an aromatic primary diamine. The foamed polyimide is produced, for example, by heating at a temperature above about 300° C.

The reaction parameters and preferred operating conditions of this process are more fully taught in U.S. Pat. No. 3,520,837.

An additional example of the use of a precursor compound of the tetracarboxylic acid is provided by the process for forming a polypryomellimide polymer having the formula II wherein $R_1$ is

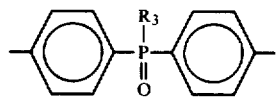

and $R_3$ is alkyl or aryl as previously defined.

Accordingly, these polypyromellimides may be prepared by first producing an alkyl salt of the tetracarboxylic acid precursor to the dianhydrides of formula (III), by contacting said tetraacid with an alkanol of 1-4 carbon atoms such as methanol. This alkyl salt is then heated with a previously described diamine compound, bis(m-aminophenyl)alkyl phosphine oxide, having the formula

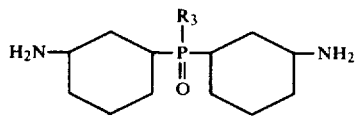

to produce the above polymer. This process is known, having been previously explained in U.S. Pat. No. 3,531,437.

It should be understood that copolymers containing at least some recurring units of formulas (I) or (II) and any remainder being polyamic acid or polyimide monomeric units formed by reaction of a tetracarboxylic acid dianhydride and a diamine are also included in this invention. Such copolymeric substances may be preferred for use in certain applications wherein modified physical characteristics are required. For example, a copolymer is generally easy to coalesce since it does not possess a crystalline melting point and is thus very suitable for use in producing molded articles.

The copolymers may be formed by reaction of a mixture of dianhydrides containing at least one dianhydride of formula III with a single diamine or a mixture of diamines. Suitable dianhydrides for forming such a mixture may be selected from the tetracarboxylic acid dianhydrides characterized by the formula:

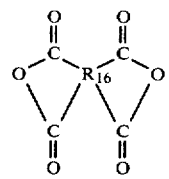

wherein $R_{16}$ is a tetravalent organic radical selected from the group consisting of aromatic, aliphatic, cycloaliphatic, heterocyclic, combination of aromatic and aliphatic and substituted groups thereof. Illustrations of suitable second dianhydrides include pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene-3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5-tetracarboxylic dianhydride, 3,4,3',4'-benzophenone tetracarboxylic dianhydride, pyrrolidine-2,3,4,5-tetracarboxylic dianhydride, ethylene tetracarboxylic dianhydride, 1,2,3,4-butane tetracarboxylic dianhydride, naphthalene-1,4,5,8-tetracarboxylic dianhydride, decahydronaphthalene-1,4,5,8-tetracarboxylic dianhydride, 4,8-dimethyl-1,2,3,5,6,7-hexahydronaphthalene-1,2,5,6-tetracarboxylic dianhydride, 2,6-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, cyclopentane-1,2,3,4-tetracarboxylic dianhydride, etc.

Suitable diamines are all previously defined diamines of formula IV.

The reaction conditions used in the formation of these copolymers are advantageously those previously described for forming polyamic acid and polyimide polyners including the previously described cross-linked and foamed polymers.

It is easily seen that the polymeric dianhydride derivatives comprising this invention are suitably employed according to numerous processes in the prior art leading to the formation of products having a variety of physical characteristics. Besides being suitable for use in forming cross-linked and foamed polymeric products the instant novel polymers may suitably be employed in other applications and uses wherein polyamic acid polymers and their polyimide derivatives have heretofore been advantageously employed.

SPECIFIC EMBODIMENTS OF THE INVENTION

Having described my invention, the following examples are provided as further illustrative of my present invention and are not to be construed as limiting.

EXAMPLE 1—1,4-bis(tetrahydrofuran-2,5-dion-3-yl)benzene

Dianhydride Formation;

A quantity of 1,4-bis(2-carbethoxy-2-cyanoethenyl)benzene was prepared according to the following method. A drop of piperidine was added to quantities of ethyl cyanoacetate and terephthaldehyde in an excess of anhydrous ethanol accompanied by stirring at ambient temperature. A clear solution slowly formed yielding a crystalline condensation product upon further reaction. After 10 hours the condensation was terminated, the precipitate collected by filtration, and washed with methanol. The product, in the form of yellowish-green needles was soluble in hot benzene and acetone but insoluble in ethanol.

Next, 32.4 g (0.1 mole) of this diester was stirred with sodium cyanide (19.6 g, 0.4 mole) in 400 ml of 50 percent aqueous ethanol at ambient temperature, in a 1-liter glass flask. After 1.5 hours the solution was acidified by adding excess concentrated HCl. The product, 1,4-bis(2-carbethoxy-1,2-dicyanoethyl)benzene was deposited as a yellow oil which solidified upon standing.

Next, 200 ml of concentrated hydrochloric acid was added to the decanted reaction flask. Approximately 10 ml of glacial acetic acid was added to inhibit foaming and the mixture was refluxed for 10 hours. A white precipitate gradually formed and separated from the mixture. Refluxing was discontinued and the flask and contents chilled in ice. Filtration followed by washing with ice water and oven drying in vacuo gave 30.1 g (97 percent yield) of 1,4-bis(1,2-dicarboxyethyl)benzene.

A portion of the tetraacid was then refluxed in 20 ml acetic anhydride for 2 hours. The acetic anhydride solvent was evaporated under reduced pressure and the residue collected. Recrystallization from methylethyl ketone gave a dianhydride having the following analysis.

|            | % C. | % H. | melting point°C. |
|------------|------|------|------------------|
| calculated | 61.3 | 3.65 | —                |
| found      | 61.2 | 3.85 | 182–184          |

IR and NMR spectroscopy confirmed the product's identity as 1,4-bis(tetrahydrofuran-2,5-dion-3-yl)benzene.

EXAMPLE 2—Polyamic Acid Polymer

A small quantity (1.37 g, 0.005 mole) of this dianhydride was then combined with 4,4'-oxydianiline (1.00 g, 0.005 mole) in about 12 ml of dimethylacetamide solvent and allowed to react at room temperature for about 21 hours. The resulting polyamic acid composition was spread onto glass slides and dried at 75° C. for about 30 minutes. A clear, strong film resulted.

EXAMPLE 3—Polyimide Formation

The polyamic acid film attached to a glass slide produced in Example 2 was heated in an oven to 250° C. for about 45 minutes. The film developed a golden color typical of polyimide films and remained tough and transparent.

EXAMPLE 4

A small quantity (2.74 g, 0.01 mole) of the dianhydride, 1,4-bis(tetrahydrofuran-2,5-dion-3-yl)benzene produced in Example 1 was combined with 4,4'-oxydianiline (2.0 g, 0.01 mole) in a mixture of 27 ml of m-cresol and 8 ml of toluene in a glass flask. Approximately 1 ml of triisopentylamine was added and the reaction mixture heated to about 180° C. After about 2 hours a completely homogeneous mixture resulted.

The polyimide was isolated by precipitating in acetone resulting in the recovery of 4.1 g (94 percent yield) of a white, fibrous polyimide-containing polymer. The inherent viscosity as measured in N-methylpyrrolidinone (25° C., 0.5 g/dl) was 0.69. The glass transition temperature as determined by differential scanning calorimetry was determined to be 275° C.

A tough, clear, nearly colorless, continuous, coherent film was obtained by coating a glass slide with a 17 percent solution of the polyimide in N-methylpyrrolidinone and subsequently evaporating the solvent. Alternatively, continuous, coherent articles of about the same appearance and toughness were obtained by compression molding a small sample of the polyimide at 300° C. in a standard laboratory press.

EXAMPLE 5

A polyamic acid in solution was formed by reacting the dianhydride produced in Example 1 (1.21 g, 0.004 mole) with 4,4'-oxydianiline (0.8 g, 0.004 mole) in a mixture of m-cresol (7.5 ml) and toluene (2.5 ml) having approximately 0.5 ml of triethylamine added thereto. Continued reaction for about 2 hours at elevated temperature (180° C.) resulted in formation of the polyimide. A completely homogeneous solution was obtained which was diluted further with dimethylformamide (20 ml).

Precipitation with acetone gave a white, fibrous polyimide (1.6 g, 86 percent yield) with an inherent viscosity in N-methylpyrrolidinone (25° C., 0.5 g/dl) of 1.0. A film cast from N-methylpyrrolidinone solution was tough, clear and nearly colorless. The glass transition temperature was determined to be 255° C.

EXAMPLE 6

Terephthaldehyde (53.6 g, 0.4 mole) and cyanoacetic acid (170 g, 2 moles) were combined in a round bottom flask with 350 ml of pyridine containing 20 ml piperidine. The mixture was then refluxed for about 15 hours. A yellow solution remained when refluxing ceased. After the solvent was removed by evaporation under reduced pressure a residue remained. This residue was washed with aqueous HCl followed by methanol and the product dried leaving 84.5 g (80.6 percent yield) of 1,4-bis-2-(1,3-dicyanopropyl)benzene.

A portion of the product was hydrolyzed by adding the tetracyano compound to 200 ml concentrated HCl having added thereto 50 glacial acetic acid to inhibit foaming in a glass round bottom flask. Heating was commenced and the mixture refluxed for about 9 hours.

The tetraacid product obtained upon chilling and filtration of the acid solution followed by washing with ice water had a melting point range of 256° C.-258° C.

25 g of the tetraacid was refluxed in a round bottom glass flask with 100 ml of acetic anhydride for about 7 hours. Acetic acid formed was distilled off continuously. A residue remained that was diluted with diethyl ether and the solid separated by filtration. The recovered product was washed with additional aliquots of ether. The yield of 1,4-bis(tetrahydropyran-2,6-dion-3-yl)benzene was 19.6 g, 88 percent.

EXAMPLE 7

A polyamic acid in solution was formed by reacting the dianhydride produced in Example 6 (3.02 g, 0.01 mole) with 4,4'-oxydianiline (2.0 g, 0.01 mole) in a mixture of m-cresol (25 ml) and toluene (5 ml) having about 1 ml triethylamine added thereto. Continued reaction for about 2 hours at 200° C. resulted in formation of the polyimide. The reaction was continued for an additional period of 7 hours whereupon the solution was cooled to room temperature and added to 400 ml of methanol.

A fibrous, faintly red colored precipitate of polyimide (4.1 g, 87 percent yield) resulted. The inherent viscosity (25° C., 0.5 g/dl N-methylpyrrolidinone) was 0.454. The glass transition temperature was observed to be 280° C.

EXAMPLES 8–13

The reaction conditions of Example 4 were repeated using small quantities of the same dianhydride, 1,4-bis(-tetrahydrofuran-2,5-dion-3-yl)benzene, produced in Example 1, and the diamines more fully described below. In each example the desired polyimide-containing polymer was obtained and identified.

| Example | diamine |
|---|---|
| 8 | 4,4'-methylenedianiline |
| 9 | 1,3-phenylenediamine |
| 10 | 2,4-toluenediamine |
| 11 | 2,6-toluenediamine |
| 12 | a 4:1 molar mixture of 2,4- and 2,6-toluenediamine |
| 13 | hexamethylenediamine |

I claim:

1. A polyamic acid polymer comprising recurring units at least some of which comprise the structural formula:

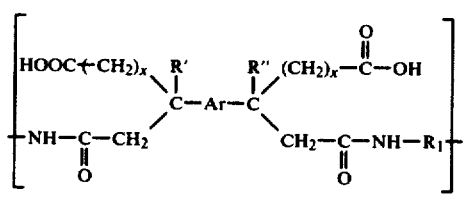

wherein Ar is a $C_{6-20}$ arylene radical selected from the group consisting of:

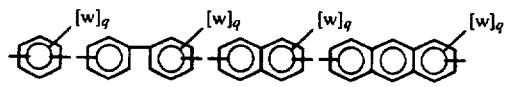

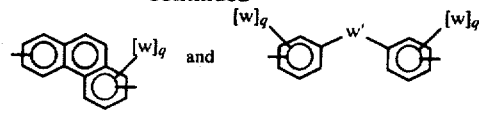

wherein w in each occurrence is halo, nitro, or a $C_{1-10}$ radical selected from alkyl, aryl, alkaryl, aralkyl, haloalkyl, haloaryl, aryloxy and alkoxy; q is an integer from zero to 4; and w' is oxygen, sulfur, alkylene, oxyalkylene, alkylenedioxy or polyoxyalkylene; R', R" individually are hydrogen or alkyl, aryl, aralkyl or alkaryl radicals containing up to 10 carbon atoms, both x's are either zeros or ones; and $R_1$ is each occurrence a divalent organic radical remnant of a diamine containing at least 2 carbon atoms, and any remainder being polyamic acid monomeric units formed by reaction of a tetracarboxylic acid dianhydride and a diamine.

2. The polyamic acid polymer according to claim 1 wherein x is zero.

3. The polyamic acid polymer according to claim 1 wherein x is 1.

4. The polyamic acid polymer according to claim 1 wherein Ar is a phenylene radical.

5. The polyamic acid polymer according to claim 4 wherein $R_1$ is each occurrence a divalent radical remnant of a diamine selected from the group consisting of: 4,4'-oxydianiline, 1,3-phenylenediamine, 1,4-phenylenediamine, toluene-2,4-diamine, toluene-2,6-diamine, 4,4'-methylenedianiline, hexamethylenediamine, and mixtures thereof.

6. A polymer according to claim 1, 4 or 5 being a homopolymer of said recurring units.

7. The homopolymer according to claim 6 of at least 5 of said recurring units.

8. A polyimide polymer comprising recurring units at least some of which comprise the structural formula

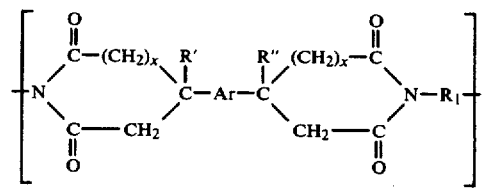

wherein Ar is a $C_{6-20}$ arylene radical selected from the group consisting of

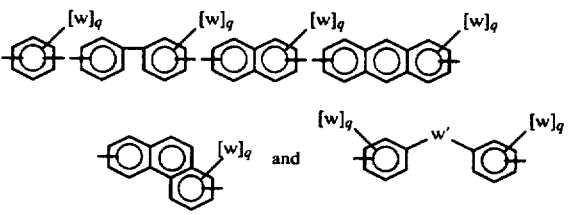

wherein w in each occurrence is halo, nitro, or a $C_{1-10}$ radical selected from alkyl, aryl, alkaryl, aralkyl, haloalkyl, haloaryl, aryloxy and alkoxy; q is an integer from zero to 4; and w' is oxygen, sulfur, alkylene, oxyalkylene, alkylenedioxy or polyoxyalkylene; R', R" individually are hydrogen or alkyl, aryl, aralkyl or alkaryl radicals containing up to 10 carbon atoms, both x's are zeros or ones, and $R_1$ is each occurrence a divalent organic radical remnant of a diamine containing at least 2 carbon atoms, and any remainder being polyimide monomeric units formed by reaction of a tetracarboxylic acid dianhydride and a diamine.

9. The polyimide polymer of claim 8 wherein x is zero.

10. The polyimide polymer of claim 8 wherein x is one.

11. The polyimide polymer of claim 8 wherein Ar is a phenylene radical.

12. The polyimide polymer of claim 11 wherein $R_1$ is each occurrence a divalent radical remnant of a diamine selected from the group consisting of: 4,4'-oxydianiline, 1,3-phenylenediamine, 1,4-phenylenediamine, toluene-2,4-diamine, toluene-2,6-diamine, 4,4'-methylenedianiline, hexamethylenediamine, and mixtures thereof.

13. A polymer according to claim 8, 11 or 12 being a homopolymer of said recurring units.

14. The homopolymer according to claim 13 of at least 5 of said recurring units.

15. A continuous coherent article composed of the polymer of claim 8.

* * * * *